United States Patent [19]

Nagatsuka et al.

[11] Patent Number: 5,103,361
[45] Date of Patent: Apr. 7, 1992

[54] MAGNETIC HEAD APPARATUS HAVING NON-MAGNETIC METAL INTERPOSED BETWEEN PIEZOELECTRIC MEMBERS

[75] Inventors: Shintaro Nagatsuka; Naoki Miyagi, both of Yokohama, Japan

[73] Assignee: Kabushiki Kaisha Toshiba, Kawasaki, Japan

[21] Appl. No.: 470,682

[22] Filed: Jan. 26, 1990

[30] Foreign Application Priority Data

Mar. 30, 1989 [JP] Japan .................................. 1-80185

[51] Int. Cl.$^5$ .......................... G11B 5/56; G11B 21/24
[52] U.S. Cl. ..................... 360/109; 360/77.16
[58] Field of Search ............... 360/77.16, 109

[56] References Cited

U.S. PATENT DOCUMENTS

| 4,151,569 | 4/1979 | Hathaway . |
| 4,152,734 | 5/1979 | Louth . |
| 4,438,469 | 3/1984 | Ohba ................... 360/109 |

FOREIGN PATENT DOCUMENTS 52-145010 12/1977 Japan .
52-145011 12/1977 Japan .
57-158012 9/1982 Japan .

Primary Examiner—A. J. Heinz
Attorney, Agent, or Firm—Cushman, Darby & Cushman

[57] ABSTRACT

A magnetic head apparatus has a piezoelectric element comprising a pair of piezoelectric members. A magnetic head is mounted on the piezoelectric element and records/reproduces desired data. A non-magnetic metal member having a predetermined coefficient of thermal expansion is formed between the piezoelectric members. A driving circuit is connected to the piezoelectric element and the non-magnetic metal member, and drives the magnetic head in a direction substantially perpendicular to the head trace direction, by applying a predetermined voltage.

13 Claims, 3 Drawing Sheets

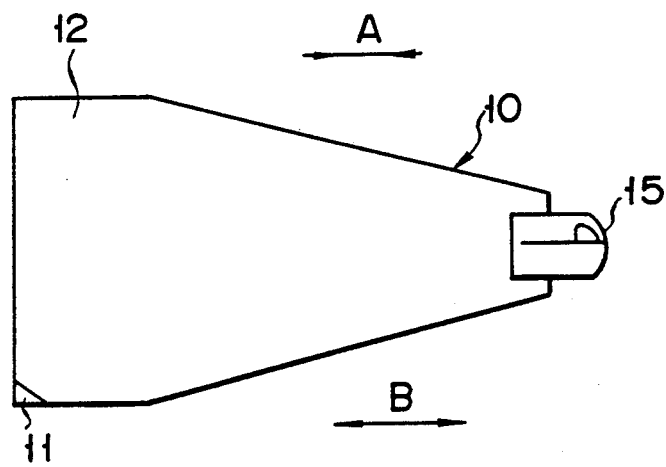
F I G. 1A
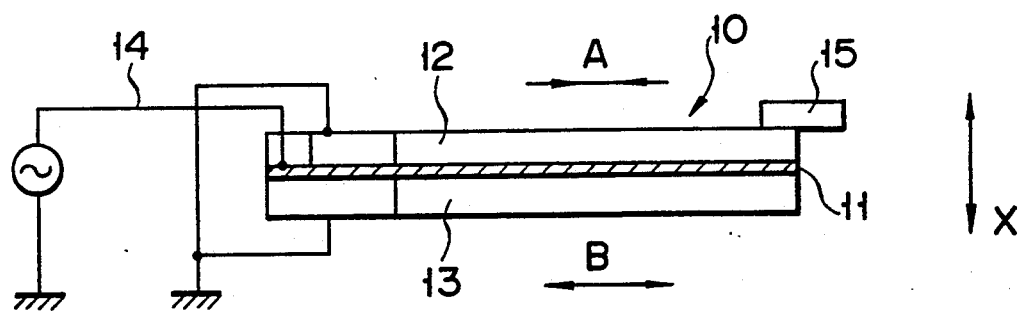
F I G. 1B

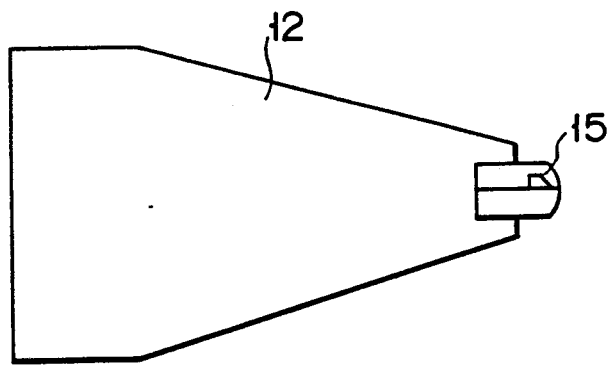
F I G. 5A
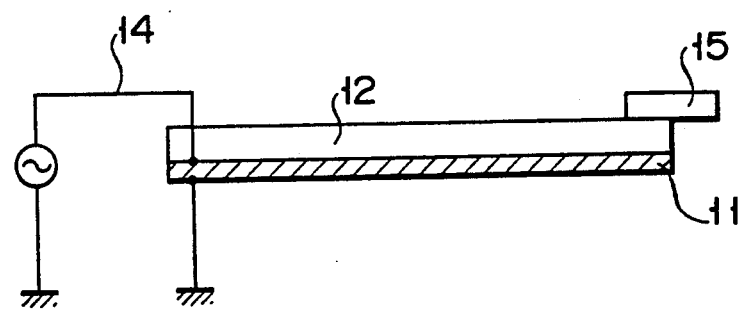
F I G. 5B

MAGNETIC HEAD APPARATUS HAVING NON-MAGNETIC METAL INTERPOSED BETWEEN PIEZOELECTRIC MEMBERS

BACKGROUND OF THE INVENTION

1. Field of the Invention

The present invention relates to a magnetic head apparatus and, more particularly, to a magnetic head apparatus mounted on, for example, a video cassette recorder (VCR).

2. Description of the Related Art

When a VCR is operated in a reproducing mode, so called noise bars may be generated in a still image or an image at the time of a special reproducing mode, such as the one third speed reproduction mode. To prevent noise bars, the VCR has a magnetic head apparatus in which its head is driven in a direction substantially perpendicular to the head trace direction. In such an apparatus, the magnetic head is mounted on the distal end of a piezoelectric element comprising a pair of piezoelectric members, which are ceramic and attached to each other by an adhesive. The piezoelectric element is known as a bimorph element, in which one of the piezoelectric members contracts and the other expands when a driving voltage is applied. As the piezoelectric members contract and expand, respectively, the magnetic head is driven in the direction substantially perpendicular to the head trace direction.

In general, the ceramic which is used to form a piezoelectric element is difficult to treat and easy to break during the manufacturing process. Hence, an element of a desired shape cannot be obtained, and therefore the magnetic head cannot be driven or controlled accurately.

To reinforce the element, a thin metal plate can be interposed between the piezoelectric members. Recently, a piezoelectric element has been developed which comprises a pair of piezoelectric members and a thin metal plate interposed therebetween. The thin metal plate is made of 42Ni-Fe having a coefficient of thermal expansion of $40 \times 10^{-7}$ $(°C)^{-1}$, which is substantially the same as the coefficient of thermal expansion of the piezoelectric element, i.e., 20 to $40 \times 10^{-7}$ $(°C)^{-1}$. 42Ni-Fe is made from Invar, which is known as a material having a small coefficient of thermal expansion, by slightly changing its composition. Such a magnetic head apparatus is disclosed, for example, in U.S. Pat. No. 4,151,569, in which a brass plate is interposed between two piezoelectric ceramic members. By use of such a thin metal plate, the piezoelectric members are reinforced, resulting in a stronger piezoelectric element as a whole. In addition, since the thin metal plate can be subjected to etching and press working, the manufacturing accuracy of head apparatuses has been considerably increased.

However, since 42Ni-Fe is a magnetic substance, the metal plate made of this material may be magnetized by the influence of an external magnetic field. For this reason, the magnetic head provided on the piezoelectric element having a 42Ni-Fe plate also tends to be magnetized. This tendency degrades the characteristic of the magnetic head, and the magnetic head apparatus is of no practical use.

SUMMARY OF THE INVENTION

It is accordingly an object of the present invention to provide a magnetic head apparatus having high accuracy head characteristics, by using a bimorph type piezoelectric element in which a non-magnetic elastic metal is adhered between a pair of piezoelectric members.

It is another object of the present invention to provide a magnetic head apparatus having high accuracy head characteristics, by using a unimorph type piezoelectric element in which a non-magnetic elastic metal is adhered to a single piezoelectric member.

To achieve these objects, the magnetic head apparatus of the present invention comprises: a piezoelectric element having at least one piezoelectric member; a magnetic head, mounted on the piezoelectric element, for recording and reproducing desired data; a non-magnetic metal member, having a predetermined coefficient of thermal expansion, which is formed in close contact with the piezoelectric member; and driving means, connected to the piezoelectric member and the non-magnetic metal member, for driving the magnetic head in a direction substantially perpendicular to the head trace direction by applying a predetermined voltage.

BRIEF DESCRIPTION OF THE DRAWINGS

FIGS. 1A and 1B are a plan view and a side view, respectively, showing the magnetic head apparatus according to a first embodiment of the present invention;

FIGS. 5A and 5B are a plan view and a side view, respectively, showing the magnetic head apparatus according to a second embodiment of the present invention.

DETAILED DESCRIPTION OF THE PREFERRED EMBODIMENTS

Figure 2:
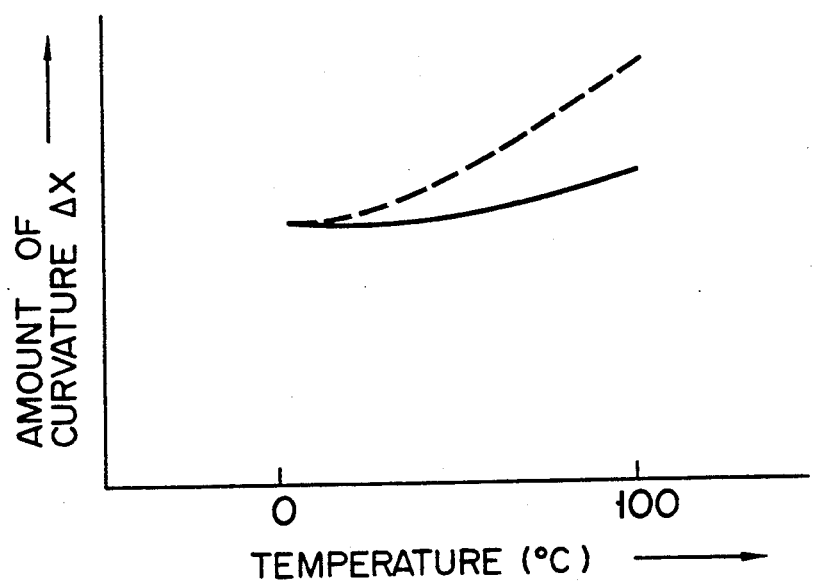
FIG. 2 is a graph showing the amount of curvature of the piezoelectric element in accordance with a change of temperature.

The present invention will be described in detail with reference to the accompanying drawings.

FIG. 1A is a plan view of the magnetic head apparatus according to a first embodiment of the present invention, and FIG. 1B is a side view thereof. In both drawings, a reference numeral 10 denotes a piezoelectric element. Piezoelectric element 10, which is a so-called bimorph type, comprises a pair of piezoelectric members 12 and 13 made of ceramics such as PZT (titanic acid, zirconic acid, lead oxide, etc.) and an elastic non-magnetic metal film 11 sandwiched therebetween. Piezoelectric members 12 and 13 are about 0.16 mm thick, and metal film 11 is about 0.05 mm thick. Metal film 11 is made of molybdenum (Mo) and serves as an intermediate electrode. The coefficient of thermal expansion of metal film 11 is about $50 \times 10^{-7}$ $(°C)^{-1}$, which is almost the same as that of piezoelectric members 12 and 13, i.e., $40 \times 10^{-7}$ $(°C)^{-1}$. It is desirable that the coefficient of thermal expansion of metal film 11 is less than two times that of piezoelectric members 12 and 13. Also, osmium (Os) and tungsten (W), which have smaller thermal expansion coefficients, may be used as non-magnetic metals. However, molybdenum is most suitable in terms of treatment and cost.

Figure 3:
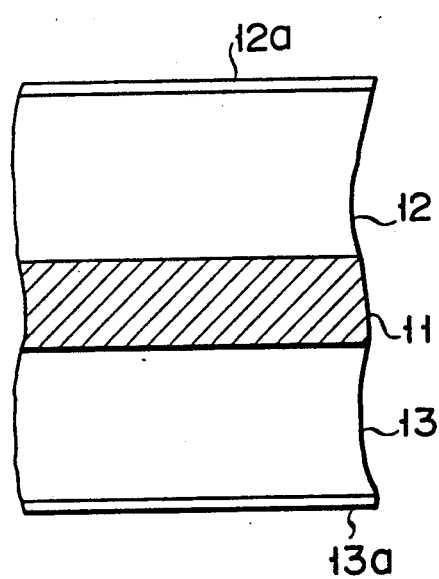
FIG. 3 is an enlarged cross sectional view showing part of the piezoelectric element shown in FIG. 1B.
Figure 4:
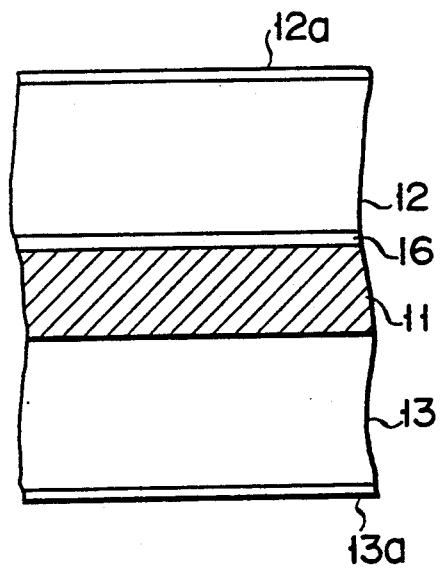
FIG. 4 is an enlarged cross sectional view showing a modification of the piezoelectric element shown in FIG. 3.

As shown in FIG. 3, electrode layers 12a and 13a are formed on the external surfaces of piezoelectric members 12 and 13, respectively. Further, as shown in FIG. 1B, driving circuit 14 for applying a voltage is connected to electrode layers 12a and 13a, and metal film 11. In a case where driving circuit 14 is connected to metal film 11 by soldering, metal film 11 is coated with Ni or the like by means of electroless plating, thereby forming plated layer 16, as shown in FIG. 4. Piezoelectric element 10 is supported by a supporting member (not shown) at its proximal end, and comprises magnetic head 15 at its distal end.

In the magnetic head apparatus thus arranged, when a driving voltage is applied to metal film 11 and electrode layers 12a and 13a from driving circuit 14, piezoelectric member 12 contracts in the directions indicated by arrows A (or expands in the directions indicated by arrows B), and the other piezoelectric member 13 expands in the directions indicated by arrows B (or contracts in the directions indicated by arrows A). By the contraction and expansion of the members, magnetic head 15 is driven in the directions X, substantially perpendicular to the head trace direction.

Metal film 11 will now be described in detail. Metal film 11 is not ferromagnetic at normal temperatures, and prevents magnetic head 15 from being magnetized by the influence of the external magnetic field. In addition, since metal film 11 is interposed between piezoelectric members 12 and 13, piezoelectric element 10 is reinforced in its entirety, and can be formed accurately in accordance with the manufacturing accuracy of thin metal plate 11. Moreover, even if the thicknesses of piezoelectric members 12 and 13 are different, the amount of curvature $\Delta x$ of piezoelectric element 10 in the directions of arrows X is kept within a small range, as shown in FIG. 2 by the solid line, since the thermal expansion coefficients of metal film 11 and piezoelectric members 12 and 13 are substantially the same. (In a case where the thermal expansion coefficients of the metal film and the piezoelectric members are very different, the curvature amount $\Delta x$ increases as the temperature rises, as shown in FIG. 2 by the broken line, thus making it difficult to drive/control the head accurately.)

FIGS. 5A and 5B are a plan view and a side view, respectively, of the magnetic head apparatus according to a second embodiment of the present invention. The second embodiment has the same structure as the first embodiment, except that the piezoelectric element has only one piezoelectric member, which is made of molybdenum as an elastic non-magnetic metal. This unimorph type piezoelectric element has the same advantage as in the first embodiment of the bimorph type. In other words, metal film 11 of FIG. 5B can prevent magnetic head 15 from being magnetized, the piezoelectric element can be reinforced, and other advantages described above for the first embodiment will be added.

As has been described above, according to the present invention, it is possible to provide a strong and accurate magnetic head apparatus having excellent head characteristics, in which drifting due to heat does not occur.

The present invention is not limited to the above-described embodiments, but can be variously modified within the scope of the invention

What is claimed is:

1. A magnetic head apparatus comprising:
    a piezoelectric element comprising at least one piezoelectric member;
    a magnetic head mounted on said piezoelectric element for recording and reproducing desired data;
    a non-magnetic metal member, having a predetermined coefficient of thermal expansion substantially equal to that of said piezoelectric element, and made of elastic material which is formed in close contact with said piezoelectric member; and
    driving means, connected to said piezoelectric element and said non-magnetic metal member, for driving said magnetic head in a direction substantially perpendicular to a head trace direction by applying a predetermined voltage.

2. A magnetic head apparatus according to claim 1, wherein the coefficient of thermal expansion of said non-magnetic metal member is $50 \times 10^{-7}$ (°C)$^{-1}$.

3. A magnetic head apparatus according to claim 2, wherein said non-magnetic member is made of molybdenum.

4. A magnetic head apparatus according to claim 1, wherein the coefficient of thermal expansion of said non-magnetic metal member is less than two times that of said piezoelectric element.

5. A magnetic head apparatus according to claim 1, wherein said piezoelectric element consists of one piezoelectric body.

6. A magnetic head apparatus according to claim 1, further comprising a plated layer formed by plating said non-magnetic member.

7. A magnetic head apparatus according to claim 1, further comprising an electrode layer formed on said piezoelectric element.

8. A magnetic head apparatus comprising:
    a piezoelectric element comprising a pair of piezoelectric members;
    a magnetic head mounted on said piezoelectric element for recording and reproducing desired data;
    a non-magnetic metal member, having a predetermined coefficient of thermal expansion substantially equal to that of said piezoelectric element, and made of elastic material which is formed in close contact with said piezoelectric member; and
    driving means, connected to said piezoelectric element and said non-magnetic member, for driving said magnetic head in a direction substantially perpendicular to a head trace direction by applying a predetermined voltage.

9. A magnetic head apparatus according to claim 8, wherein the coefficient of thermal expansion of said non-magnetic metal member is less than two times that of said piezoelectric element.

10. A magnetic head apparatus according to claim 8, wherein the coefficient of thermal expansion of said non-magnetic metal member is $50 \times 10^{-7}$ (°C)$^{-1}$.

11. A magnetic head apparatus according to claim 10, wherein said non-magnetic member is made of molybdenum.

12. A magnetic head apparatus according to claim 8, further comprising a plated layer formed by plating said non-magnetic metal member.

13. A magnetic head apparatus according to claim 8, further comprising an electrode layer formed on said piezoelectric element.

* * * * *